US009088747B2

(12) United States Patent
Tsukagoshi et al.

(10) Patent No.: US 9,088,747 B2
(45) Date of Patent: Jul. 21, 2015

(54) VIDEO DISPLAY SYSTEM, VIDEO DISPLAY DEVICE, ITS CONTROL METHOD, AND INFORMATION STORAGE MEDIUM

(71) Applicant: Sony Corporation, Tokyo (JP)

(72) Inventors: Ikuo Tsukagoshi, Tokyo (JP); Kenichi Imai, Tokyo (JP); Takenori Ohshima, Tokyo (JP); Yuichi Nishimori, Tokyo (JP); Masaru Masuda, Tokyo (JP)

(73) Assignees: SONY CORPORATION, Tokyo (JP); SONY COMPUTER ENTERTAINMENT INC., Tokyo (JP)

( * ) Notice: Subject to any disclaimer, the term of this patent is extended or adjusted under 35 U.S.C. 154(b) by 0 days.

(21) Appl. No.: 14/260,326

(22) Filed: Apr. 24, 2014

(65) Prior Publication Data

US 2014/0232941 A1 Aug. 21, 2014

Related U.S. Application Data

(63) Continuation of application No. 12/440,745, filed as application No. PCT/JP2007/060126 on May 17, 2007, now Pat. No. 8,730,394.

(30) Foreign Application Priority Data

Sep. 12, 2006 (JP) ................................. 2006-247284

(51) Int. Cl.
*H04N 7/18* (2006.01)
*H04N 7/00* (2011.01)
(Continued)

(52) U.S. Cl.
CPC ......... *H04N 5/4401* (2013.01); *H04N 21/4122* (2013.01); *H04N 21/4126* (2013.01); *H04N 21/440218* (2013.01); *H04N 21/4516* (2013.01)

(58) Field of Classification Search
USPC ............ 348/552–560, 734; 725/131, 100, 74, 725/78, 80, 81, 133; 709/201
See application file for complete search history.

(56) References Cited

U.S. PATENT DOCUMENTS

2004/0066308 A1 4/2004 Sampsell
2005/0120380 A1 6/2005 Wolfe
(Continued)

FOREIGN PATENT DOCUMENTS

CN 1669297 9/2005
DE 60023575 7/2006
(Continued)

OTHER PUBLICATIONS

Search Report issued in corresponding European application No. 13004015.7-1902 / 2680600 dated Dec. 4, 2013.
(Continued)

*Primary Examiner* — Michael Lee
(74) *Attorney, Agent, or Firm* — Frommer Lawrence & Haug LLP; William S. Frommer; Paul A. Levy

(57) ABSTRACT

To provide a video display system for allowing a user to look at and listen to video and sound on various means. A video display system has a video display device and a portable video display device, connected to each other for communication. The video display device produces own device video data and own device sound data to be displayed and reproduced, respectively, on the video display device; displays the own device video data and reproduces the own device sound data; encodes these data into a data format which the portable video display device is able to handle, to thereby produce other device video data and other device sound data; and sends to the portable video display device. The portable video display device receives these data, and decodes and displays the other device video data, and decodes and reproduces the other device sound data.

13 Claims, 6 Drawing Sheets

(51) Int. Cl.
  *H04N 11/00* (2006.01)
  *H04N 5/44* (2011.01)
  *H04N 21/41* (2011.01)
  *H04N 21/4402* (2011.01)
  *H04N 21/45* (2011.01)

(56) References Cited

U.S. PATENT DOCUMENTS

| | | |
|---|---|---|
| 2005/0156869 A1 | 7/2005 | Mori et al. |
| 2005/0174489 A1 | 8/2005 | Yokoyama et al. |
| 2005/0262535 A1 | 11/2005 | Uchida et al. |
| 2006/0083434 A1 | 4/2006 | Inata et al. |
| 2006/0117371 A1 | 6/2006 | Margulis |

FOREIGN PATENT DOCUMENTS

| | | |
|---|---|---|
| EP | 1 032 201 | 8/2000 |
| EP | 1 235 435 | 8/2002 |
| EP | 1 505 825 | 2/2005 |
| JP | 10-501389 | 2/1998 |
| JP | 2000 250503 | 9/2000 |
| JP | 2003-46582 | 2/2003 |
| JP | 2003 143180 | 5/2003 |
| JP | 2003-143180 | 5/2003 |
| JP | 2003 333359 | 11/2003 |
| JP | 2004 96361 | 3/2004 |
| JP | 2004-178433 | 6/2004 |
| JP | 2004-200946 | 7/2004 |
| JP | 2004-266799 | 9/2004 |
| JP | 2005-095601 | 4/2005 |
| JP | 2005-143081 | 6/2005 |
| JP | 2005-173641 | 6/2005 |
| JP | 2005 173641 | 6/2005 |
| JP | 2005 175995 | 6/2005 |
| JP | 2005-245927 | 9/2005 |
| JP | 2006-115244 | 4/2006 |
| JP | 2006 155187 | 6/2006 |
| JP | 2006-186737 | 7/2006 |
| WO | WO 03 096678 | 11/2003 |
| WO | WO 2005/122025 | 12/2005 |
| WO | WO 2006 057130 | 6/2006 |

OTHER PUBLICATIONS

Office Action issued in corresponding Japanese Patent Application No. 2011-167271 dated Mar. 12, 2013 and a partial English translation.
Office Action issued in corresponding Japanese Patent Application No. 2011-167271 dated Aug. 13, 2013 and the Partial English Translation.
Office Action for corresponding Japanese Patent Application No. 2006-247284 dated Sep. 27, 2011.
Yumemiru Technology No. 5, "Server draws screen! Next generation game environment G-cluster", Gekkan ASCII, Japan, ASCII Corporation, Jun. 1, 2006, vol. 30, No. 6, pp. 94-97.
Office Action issued in corresponding European application No. 07743561.8 dated Apr. 16, 2013.
Office Action issued in corresponding European application No. 07743561.8 dated Jan. 25, 2012.
English Translation of the International Preliminary Report on Patentability issued in International Application No. PCT/JP2007/060126.
Office Action issued in corresponding Japanese application No. 2013-235050 mailed Oct. 28, 2014 and the Partial English Translation.
Satoshi Miura et al., "Group member composition in the large-scale community network which a model Peer-to-Peer was used for", Report on Technical Research, the Institute of Electronics, Information and Communication Engineers, Japan, May 9, 2003, vol. 103, No. 56, pp. 19-24.
Mitsutoshi Fukuda et al., "Dynamic Topology Configuration System of N-to-N. Multicast Delivery Tree for Mobile User", Report on Technical Research, the Institute of Electronics, Information and Communication Engineers, Japan, Jan. 28, 2004, vol. 2004, No. 8, pp. 61-66.
Office Action issued in corresponding Japanese Application No. 2013-235050 dated Apr. 28, 2015 and the Partial English Translation.

| GROUP NAME | DEVICE IDENTIFICATION INFORMATION |
|---|---|
| GROUP G1 | PORTABLE VIDEO DISPLAY DEVICE 50a |
| GROUP G1 | PORTABLE VIDEO DISPLAY DEVICE 50b |
| GROUP G2 | PORTABLE VIDEO DISPLAY DEVICE 50c |
| GROUP G3 | PORTABLE VIDEO DISPLAY DEVICE 50d |

VIDEO DISPLAY SYSTEM, VIDEO DISPLAY DEVICE, ITS CONTROL METHOD, AND INFORMATION STORAGE MEDIUM

This is a continuation of application Ser. No. 12/440,745, filed Aug. 14, 2009, which was filed pursuant to 35 USC 371, based on International Application PCT/JP2007/060126, filed May 17, 2007, and claims priority to Japanese patent application number 2006-247284, filed Sep. 12, 2006, the entirety of which is incorporated herein by reference.

TECHNICAL FIELD

The present invention relates to a video display system, a video display device, a control method for such as display device, and an information storage medium for displaying video and reproducing sound.

BACKGROUND ART

There is available a video display device for displaying video on a monitor of, e.g., a home-use television set receiver and the like connected thereto, and reproducing sound via a speaker of the same. Also, some of the video display devices are portable video display devices which can be carried by a user. As one example, these video display devices read encoded video data and sound data from a computer readable information storage medium, such as a DVD, a hard disk, and the like, and then based on the read data, produces video data for display, in accordance with the capacity (size of the display screen and the like) of a monitor, and sound data for reproduction, in accordance with the capacity (the number of reproduction channels and the like) of a speaker. Then, the produced video data is displayed on the monitor and the produced sound data is reproduced via the speaker.

SUMMARY OF THE INVENTION

Problems to be Solved by the Invention

However, according to the above-described conventional technique, the video display device merely outputs video data and sound data produced in accordance with its own monitor and speaker, or those connected thereto, to these monitors and speakers. Therefore, a user can look at and listen to the video data and sound data read by the video display device only on limited means.

The present invention has been conceived in view of the above, and one of the objects of the present invention is to provide a video display system, a video display device, a control method for the video display device, and an information storage medium for making it possible for a user to look at and listen to video and sound on a variety of means.

Means to Solve the Problems

A video display system according to the present invention to attain the above described objects is a video display system having a video display device and a portable video display device, connected to each other for communication, wherein the video display device comprises own device video data producing means for producing own device video data to be displayed on the video display device; own device sound data producing means for producing own device sound data to be reproduced on the video display device; video and sound output means for displaying the produced own device video data and reproducing the produced own device sound data; other device video data producing means for producing other device video data in a data format different from a data format of the own device video data; other device sound data producing means for producing other device sound data in a data format different from a data format of the own device sound data; and data sending means for sending the other device video data and the other device sound data to the portable video display device, and the portable video display device comprises data receiving means for receiving the sent other device video data and the sent other device sound data; and video and sound output means for displaying the received other device video data and reproducing the received other device sound data.

Also, another video display system according to the present invention is a video display system having a video display device and a portable video display device, connected to each other for communication, wherein the video display device comprises own device video data producing means for producing own device video data to be displayed on the video display device; own device sound data producing means for producing own device sound data to be reproduced on the video display device; video and sound output means for displaying the produced own device video data and reproducing the produced own device sound data; encoding means for encoding the own device video data and the own device sound data into a data format which the portable video display device is able to handle, to there produce other device video data and other device sound data; and data sending means for sending the other device video data and the other device sound data to the portable video display device, and the portable video display device comprises data receiving means for receiving the sent other device video data and the sent other device sound data; and video and sound output means for decoding and displaying the received other device video data and decoding and reproducing the received other device sound data.

Also, a video display device according to the present invention is a video display device connected for communication to a portable video display device, comprising own device video data producing means for producing own device video data to be displayed on the video display device; own device sound data producing means for producing own device sound data to be reproduced on the video display device; video and sound output means for displaying the produced own device video data and reproducing the produced own device sound data; encoding means for encoding the own device video data and the own device sound data into a data format which the portable video display device is able to handle, to thereby produce other device video data and other device sound data; and data sending means for sending the other device video data and the other device sound data to the portable video display device.

In the above described video display device, the encoding means may convert the own device video data into a size which the portable video display device is able to display, and then encode the own device video data that has been converted in size, to thereby produce the other device video data.

Also, in the above described video display device, the encoding means may reduce a number of channels of the own device sound data, and then encode the own device sound data having a reduced number of channels, to thereby produce the other device sound data.

Also, in the above described video display device, the own device video data producing means may decode encoded video data stored in storage means, to thereby produce the own device video data, the own device sound data producing means may decode encoded sound data stored in the storage means, to thereby produce the own device sound data, and the encoding means may encode at least one of the own device video data and the own device sound data into a data format different from that of the encoded video data and the encoded sound data stored in the storage means.

Also, in the above described video display device, the encoding means may encode at least one of the own device video data and the own device sound data into a data format selected based on information received from the portable video display device.

Also, the above described video display device may further comprise display mode switching means for receiving a connection start request and a connection end request sent from the portable video display device, then switching a display mode to an other device display mode in response to the received connection start request and to an own device display mode in response to the received connection end request; wherein the own device video data producing means may output the produced own device video data to a predetermined frame buffer when the display mode is the own device display mode, and to a memory area different from the frame buffer when the display mode is the other device display mode, the own device sound data producing means may output the produced own device sound data to a predetermined sound buffer when the display mode is the own device display mode, and to a memory area different from the sound buffer when the display mode is the other device display mode, the video and sound output means may read and display the own device video data from the frame buffer, and may read and reproduce the own device sound data from the sound buffer, and the encoding means may read and encode the own device video data and the own device sound data from the memory areas.

Also, the above described video display device may be connected for communication to a plurality of portable video display devices, and may further comprise information holding means for holding information correlating each of the portable video display devices to any of a plurality of groups, and the encoding means may produce a plurality of same or different other device video data and a plurality of same or different other device sound data for the respective groups, and the data sending means may send the other device video data and the other device sound data produced for the respective groups to the respective portable video display devices correlated to the respective groups according to the held information.

Also, a control method for a video display device according to the present invention is a control method for a video display device connected for communication to a portable video display device; comprising a step of producing own device video data to be displayed on the video display device; a step of producing own device sound data to be reproduced on the video display device; a step of displaying the produced own device video data and reproducing the produced own device sound data; a step of encoding the own device video data and the own device sound data into a data format which the portable video display device is able to handle, to thereby produce other device video data and other device sound data; and a step of sending the other device video data and the other device sound data to the portable video display device.

Also, an information storage medium according to the present invention is a computer readable information storage medium storing a program for causing a video display device connected for communication to a portable video display device to function as own device video data producing means for producing own device video data to be displayed on the video display device; own device sound data producing means for producing own device sound data to be reproduced on the video display device; video and sound output means for displaying the produced own device video data on video display means and reproducing the produced own device sound data on sound reproducing means; encoding means for encoding the own device video data and the own device sound data into a data format which the portable video display device is able to handle, to thereby produce other device video data and other device sound data; and data sending means for sending the other device video data and the other device sound data to the portable video display device.

BEST MODE FOR CARRYING OUT THE INVENTION

In the following, one embodiment of the present invention will be described with reference to the accompanying drawings. A video display system according to this embodiment comprises an entertainment system 10 operating as a video display device and a portable video display device 50. The entertainment system 10 is connected to the portable video display device 50 via a radio communication network for mutual data exchange.

Figure 1:
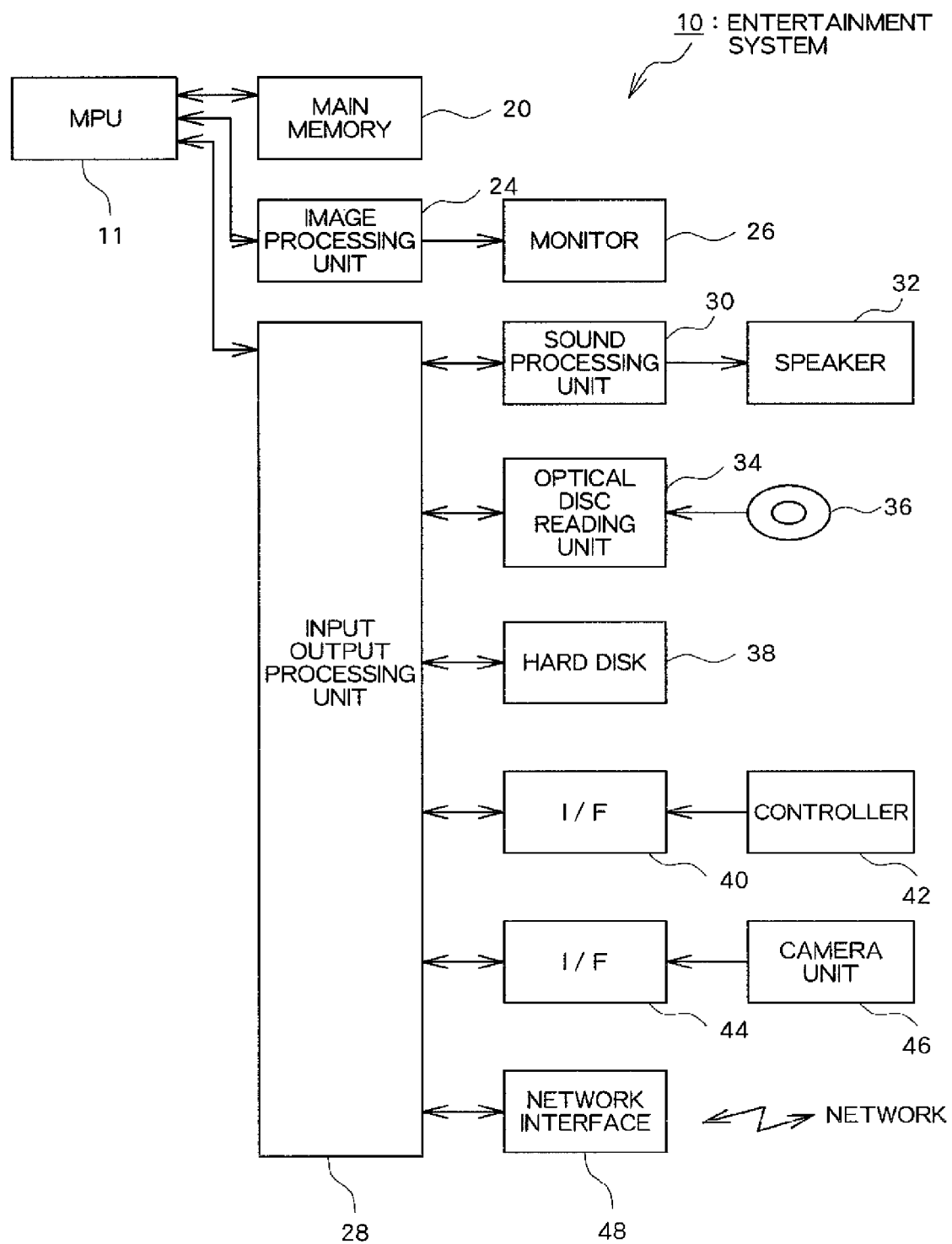
FIG. 1 is a hardware structural diagram of an entertainment system according to an embodiment of the present invention.

FIG. 1 is a diagram showing a hardware structure of an entertainment system according to this embodiment. As shown in the diagram, the entertainment system 10 is a computer system comprising an MPU (Micro Processing Unit) 11, a main memory 20, an image processing unit 24, a monitor 26, an input output processing unit 28, a sound processing unit 30, a speaker 32, an optical disc reading unit 34, a hard disk 38, interfaces (I/F) 40, 44, a controller 42, a camera unit 46, and a network interface 48.

Figure 2:
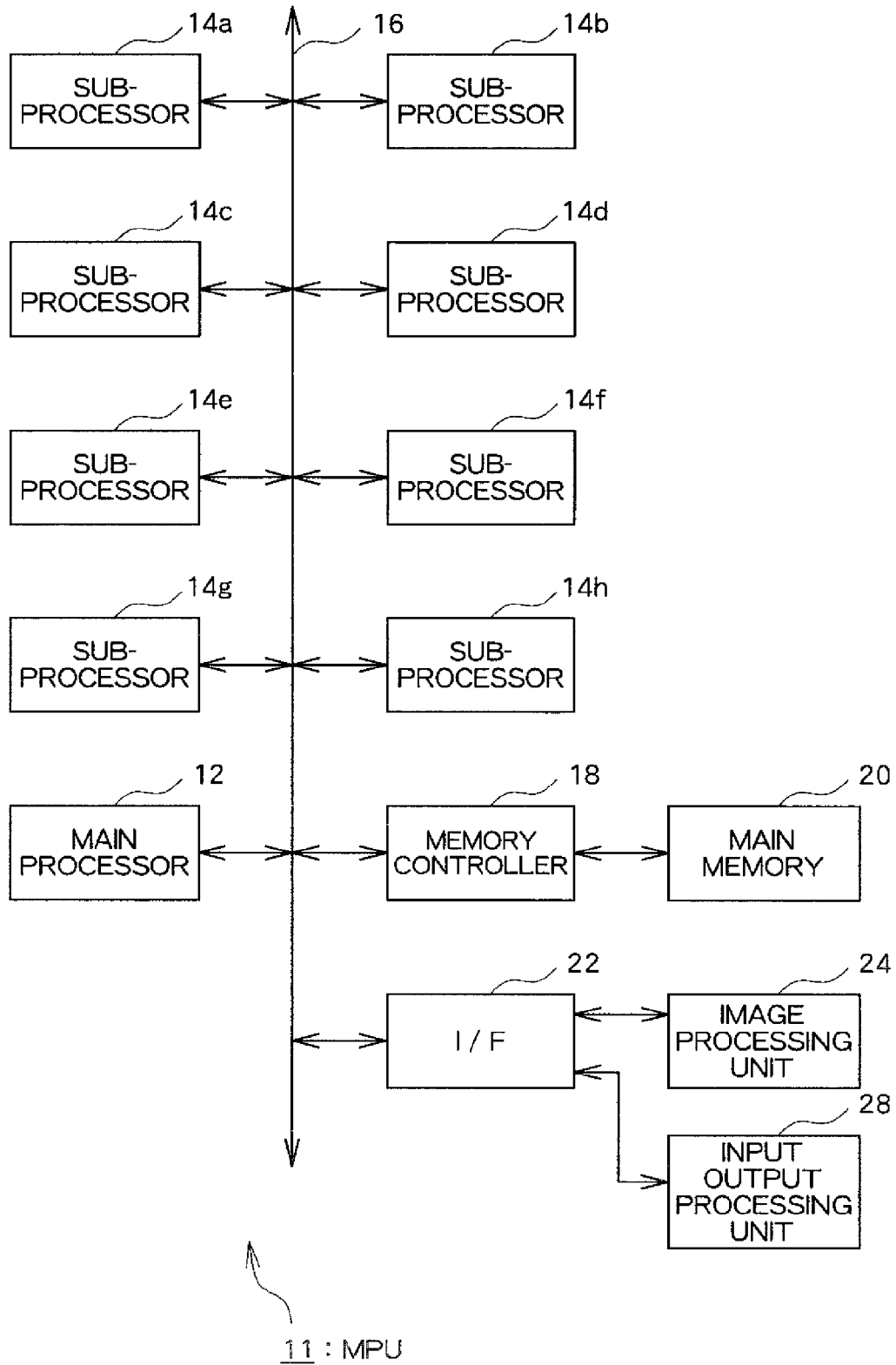
FIG. 2 is a detailed structural diagram of an MPU.

FIG. 2 is a diagram showing a structure of the MPU 11. As shown in the diagram, the MPU 11 comprises a main processor 12, sub-processors 14a, 14b, 14c, 14d, 14e, 14f, 14g, 14h, a bus 16, a memory controller 18, and an interface (I/F) 22.

The main processor 12 carries out various information processes and controls the sub-processors 14a to 14h, based on an operating system stored in a ROM (Read Only Memory) (not shown), a program and data read from the optical disc 36, such as, e.g., a DVD (Digital Versatile Disk)-ROM and so forth, and a program and data supplied via a communication network and so forth.

The sub-processors 14a to 14h carry out various information processes according to an instruction from the main processor 12, and control the respective units of the entertainment system 10, based on a program and data read from the optical disc 36, such as, e.g., a DVD-ROM and so forth, and a program and data supplied via a communication network and so forth.

The bus 16 is used for exchanging an address and data among the respective units of the entertainment system 10. The main processor 12, sub-processors 14a to 14h, memory controller 18, and interface 22 are connected to one another via the bus 16 for mutual data exchange.

The memory controller 18 accesses the main memory 20 according to an instruction from the main processor 12 and sub-processors 14a to 14h. A program and data read from the optical disc 36 and/or hard disk 38 and a program and data supplied via a communication network are written into the main memory 20 as required. The main memory 20 is used as a working memory of the main processor 12 and sub-processors 14a to 14h.

The image processing unit 24 and input output processing unit 28 are connected to the interface 22, via which data exchange between the main processor 12 and sub-processors 14a to 14h, and the image processing unit 24 or input output processing unit 28, is carried out.

The image processing unit 24 comprises a GPU (Graphical Processing Unit) and a frame buffer. The GPU renders various screen images into the frame buffer, based on image data supplied from the main processor 12 and sub-processor 14a to 14h. A screen image formed in the frame buffer is converted into a video signal at a predetermined time and then output to the monitor 26. Note that, e.g., a home-use television set receiver is used as the monitor 26.

The input output processing unit 28 is connected to the sound processing unit 30, optical disc reading unit 34, hard disk 38, interfaces 40, 44, and network interface 48. The input output processing unit 28 controls data exchange between the main processor 12 and sub-processors 14a to 14h and the sound processing unit 30, optical disc reading unit 34, hard disk 38, interfaces 40, 44, and network interface 48.

The sound processing unit 30 comprises an SPU (Sound Processing Unit) and a sound buffer. Various sound data, such as game music, game sound effects, messages, and so forth, read from the optical disc 36 and/or hard disk 38 are stored in the sound buffer. The SPU reproduces the various sound data and outputs via the speaker 32. Note that, e.g., a speaker built into a home-use television set receiver is used as the speaker 32.

The optical disc reading unit 34 reads a program and data recorded in the optical disc 36 according to an instruction from the main processor 12 and/or sub-processors 14a to 14h. Note that the entertainment system 10 may be formed capable of reading a program and data stored in a computer readable information storage medium other than the optical disc 36.

The optical disc 36 is a general optical disc (a computer readable information storage medium), such as, e.g., a DVD-ROM or the like. The hard disk 38 is a general hard disk device. Various programs and data are stored in the optical disc 36 and/or hard disk 38 in a computer readable manner.

The interfaces (I/F) 40, 44 are interfaces for connecting various peripheral devices, such as the controller 42, camera unit 46, and so forth. A USB (Universal Serial Bus) interface, for example, may be used as such an interface. Also, a radio communication interface, e.g., a Bluetooth (registered trademark) interface and the like, may be used.

The controller 42 serves as a general purpose operation input means for use by a user to input various operations (e.g., a game operation). The input output processing unit 28 scans the states of the respective units of the controller 42 every predetermined period of time (e.g., $1/60^{th}$ of a second), and supplies an operational signal describing the scanning result to the main processor 12 and sub-processors 14a to 14h. The main processor 12 and sub-processors 14a to 14h determine the content of an operation carried out by a user, based on the operational signal. Note that the entertainment system 10 is formed capable of being connected to a plurality of controllers 42 so that the main processor 12 and sub-processors 14a to 14h can carry out various processes based on the operation signals input from the respective controllers 42.

The camera unit 46 comprises, e.g., a publicly known digital camera, and inputs a captured black and white, grayscale, or colored image every predetermined period of time (e.g., $1/60^{th}$ of a second). The camera unit 46 in this embodiment inputs a captured image as video data in JPEG (Joint Photographic Experts Group) format. The camera unit 46 is mounted on the monitor 26, having the lens thereof directed to, e.g., the user, and is connected via a cable to the interface 44. The network interface 48 is connected to the input output processing unit 28 and a communication network to relay data communication made by the entertainment system 10 via the communication network to another entertainment system 10.

Note that a radio communication interface, such as, e.g., a Bluetooth (registered trademark) interface, may be used as the network interface 48. In this embodiment, the network interface 48 is connected to a radio communication network to relay data communication between the entertainment system 10 and portable video display device 50 via the radio communication network.

Figure 3:
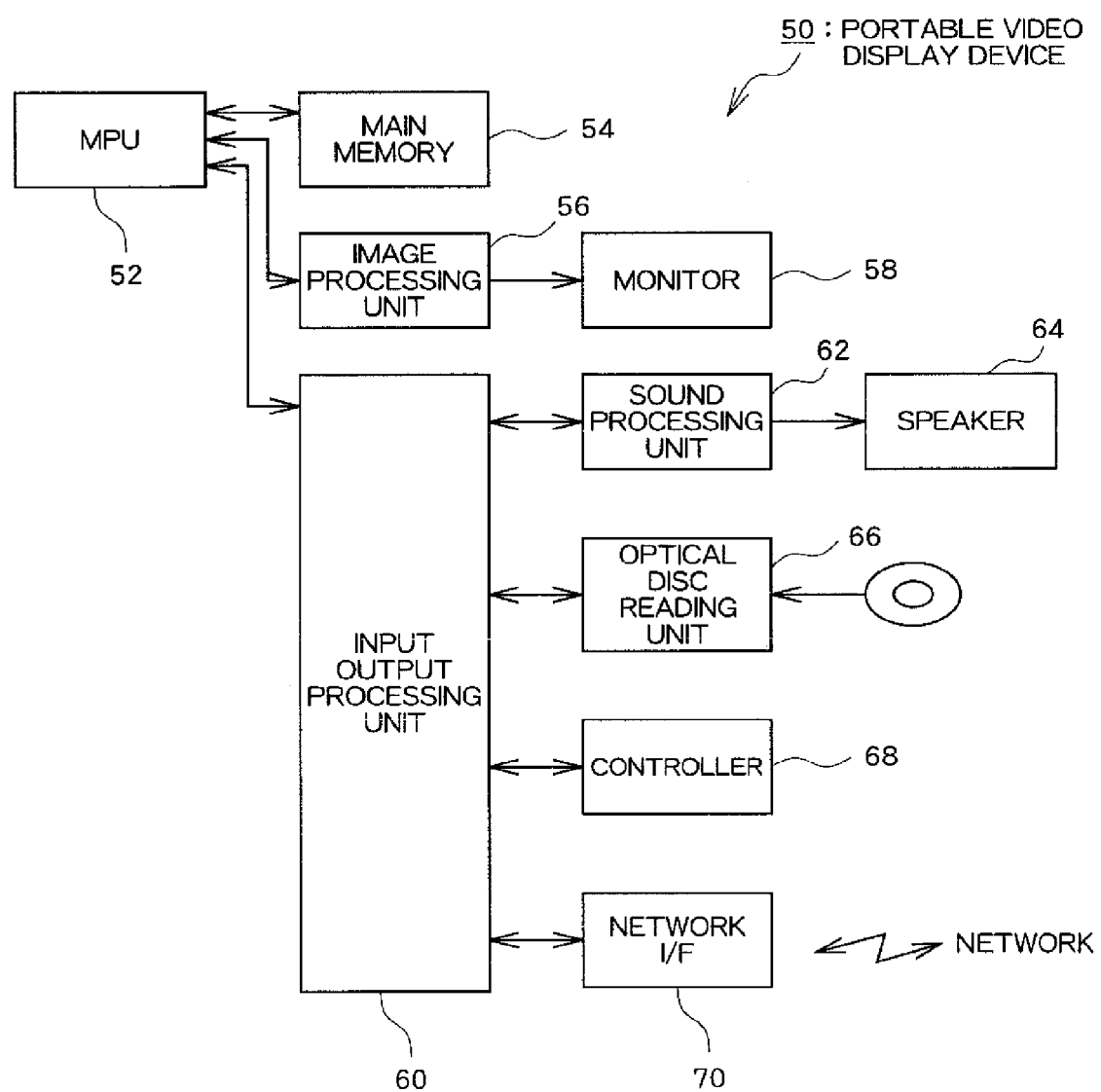
FIG. 3 is a hardware structural diagram of a portable video display device according to the embodiment of the present invention.

Meanwhile, the portable video display device 50 is a device, e.g., a portable game device or the like, for video display and sound reproduction, and can be carried by a user. In this embodiment, as shown in FIG. 3, the portable video display device 50 comprises an MPU 52, a main memory 54, an image processing unit 56, a monitor 58, an input output processing unit 60, a sound processing unit 62, a speaker 64, an optical disc reading unit 66, a controller 68, and a network interface 70.

The MPU 52 carries out various information processes and controls the respective units of the portable video display device 50, based on an operating system stored in a ROM (not shown) and a program and data read from an optical disc, such as, e.g., a UMD (registered trademark) or the like, and a program and data supplied via a communication network.

The program and data read from an optical disc and a program and data supplied via a communication network are written into the main memory 54 when necessary. The main memory 54 is used as a working memory of the MPU 52.

The image processing unit 56 comprises a GPU and a frame buffer. The GPU renders various screen images into a frame buffer, based on image data supplied from the MPU 52. The screen image formed in the frame buffer is converted into a video signal at a predetermined time, and then output to the monitor 58. Note that the monitor 58 may be, e.g., a liquid crystal display device formed integrally with the main body of the portable video display device 50.

The input output processing unit 60 is connected to the sound processing unit 62, optical disc reading unit 66, and network interface (I/F) 70. The input output processing unit 60 controls data exchange between the MPU 52 and the sound processing unit 62, optical disc reading unit 66, and network interface 70.

The sound processing unit 62 comprises an SPU and a sound buffer. Various sound data, such as game music, game sound effects, messages, and the like, read from an optical disc is stored in the sound buffer. The SPU reproduces these various sound data items and outputs via a speaker 64. Note that the speaker 64 is built into the main body of the portable video display device 50.

The optical disc reading unit 66 reads a program and data stored in an optical disc according to an instruction from the MPU 52. Note that the portable video display device 50 may be formed capable of reading a program and data stored in a computer readable information storage medium other than an optical disc. Various programs and data are stored in the optical disc in a computer readable manner.

The controller 68 is a general purpose operation input means for use by a user to input various operations (e.g., game operation). An operational signal describing the content of an operation carried out by a user using the controller 68 is supplied by the input output processing unit 60 to the MPU 52 every predetermined period of time. Note that the controller 68 has an operating member, such as various buttons and the like, equipped in the enclosure of the portable video display device 50.

The network interface 70 is connected to the input output processing unit 60 and a radio communication network, and relays data communication between the portable video display device 50 and entertainment system 10.

In the following, a function realized by the video display system comprising the above described entertainment system 10 and portable video display device 50 will be described. In the embodiment, the entertainment system 10 produces video data for its own device (own device video data) to be displayed on the monitor 26 and sound data for its own device (own device sound data) to be reproduced via the speaker 32. Then, video display and sound reproduction are carried out based on these data items. Also, the entertainment system 10 produces video data for another device (other device video data) which is in a different data format from that of the own device video data, and sound data for another device (other device sound data) which is in a different data format from that of the own device sound data. The entertainment system 10 has a function for sending these data items to the portable video display device 50. The portable video display device 50 has a function for receiving these data items having been sent, and displays video on the monitor 58 and reproduces sound via the speaker 64, based on the received data.

Figure 4:
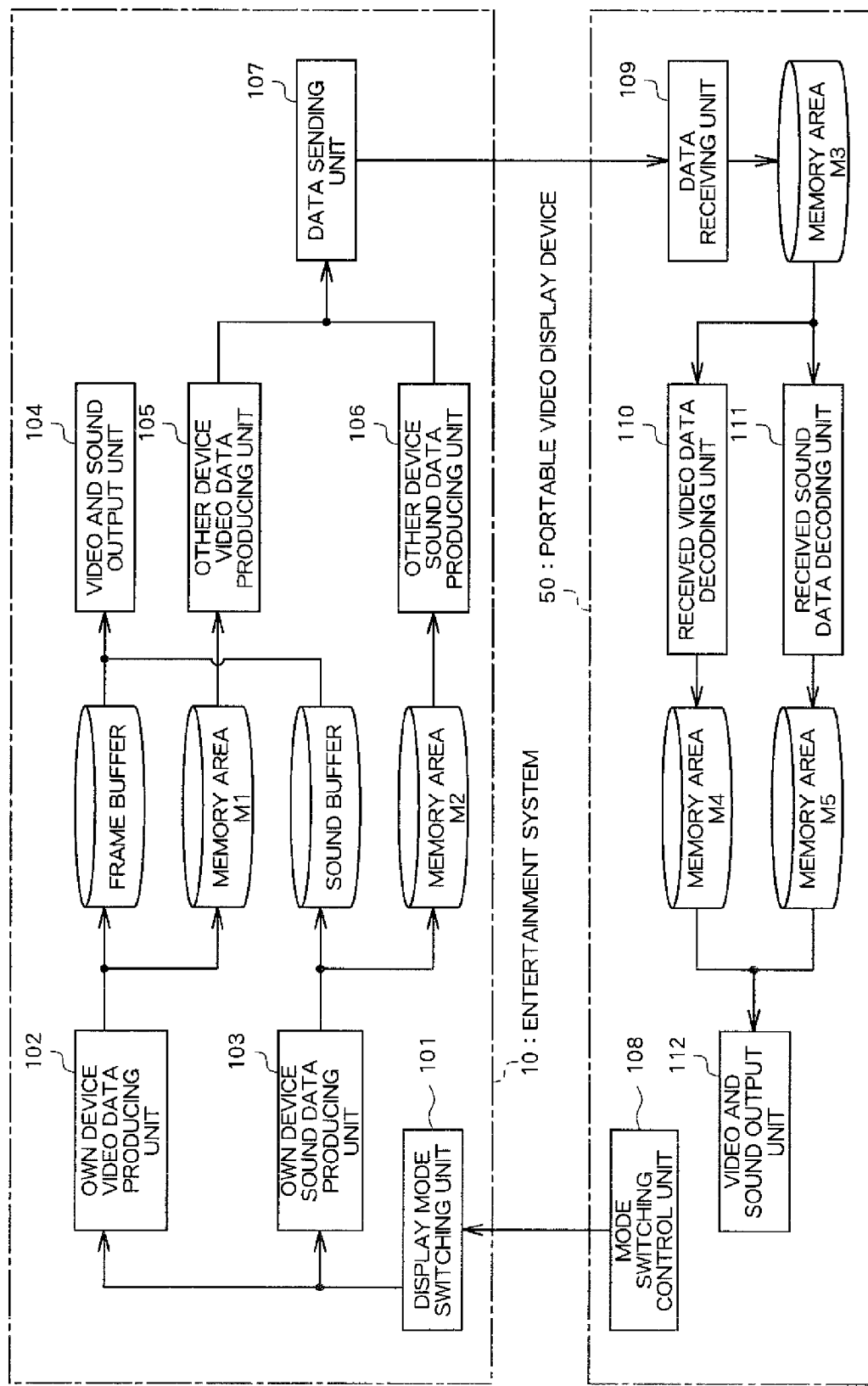
FIG. 4 is a functional block diagram showing an example of a function of a video display system according to an embodiment of the present invention.

FIG. 4 is a functional block diagram showing one example of a function realized in the video display system according to this embodiment. Here, an example in which other device video data and other device sound data are produced based on the own device video data and own device sound data will be described.

As shown in FIG. 4, the entertainment system 10 functionally comprises a display mode switching unit 101, an own device video data producing unit 102, an own device sound data producing unit 103, a video and sound output unit 104, an other device video data producing unit 105, an other device sound data producing unit 106, and a data sending unit 107. These functions can be realized by the MPU 11 by executing a program stored in the main memory 20. The program may be provided being stored in various computer readable information storage media, such as, e.g., a CD-ROM, a DVD-ROM, a memory card, and the like, or alternatively via a network, such as the Internet or the like.

Also, as shown in FIG. 4, the portable video display device 50 functionally comprises a mode switching control unit 108, a data receiving unit 109, a received video data decoding unit 110, a received sound data decoding unit 111, and a video and sound output unit 112. These functions can be realized by the MPU 52 by executing a program stored in the main memory 54. This program may be provided being stored in various computer readable information storage media, such as an optical disc, a memory card, and the like, or alternatively via a network, such as the Internet, or the like.

Initially, respective functions realized by the entertainment system 10 will be described.

The display mode switching unit 101 receives a connection start request and a connection end request from the portable video display device 50, and switches the display mode in response to the received request. Specifically, the display mode switching unit 101 switches the display mode to an other device display mode upon receipt of a connection start request and to an own device display mode upon receipt of a connection end request. Note that the entertainment system 10 operates in the own device display mode until receipt of a connection start request from the portable video display device 50 in this embodiment.

The own device display mode is a mode in which the entertainment system 10 outputs intact video data and sound data, produced for display and reproduction on its own device, to the monitor 26 and speaker 32, respectively, while the other device display mode is a mode in which the entertainment system 10 outputs the video data and sound data after converting into a data format which the portable video display device 50 can handle and process, so that the portable video display device 50 can carry out video display and sound reproduction. The respective units to be described below operate differently depending on the modes.

The own device video data producing unit 102 produces video data (hereinafter referred to as own device video data) to be displayed on the monitor 26 of the entertainment system 10.

As a specific example, the own device video data producing unit 102 decodes the encoded video data stored in a storage means, such as the optical disc 36, hard disk 38, and the like, to thereby produce own device video data. For example, the own device video data producing unit 102 decodes the encoded video data stored in the optical disc 36 and the like to thereby produce own device video data constituted by images to be displayed on the monitor 26 every predetermined period of time (e.g., every $\frac{1}{60}^{th}$ of a second). Note that the produced own device video data is video data having a size in accordance with the size of an image which can be displayed on the monitor 26.

Note that the own device video data produced by the own device video data producing unit 102 is not limited to those obtained by decoding encoded video data. For example, the own device video data may be one for a game screen image and/or a content selection menu screen image produced by executing a program stored in the optical disc 36 and the like. Alternatively, the own device video data may be one produced based on data obtained by the entertainment system 10 via a communication network and the like. Further, the own device video data may be video data containing an image formed by placing an information presentation image (an image presenting to a user various information items such as a reproduction time and the like) and/or an operation target image (an image representing an icon, a menu item, and the like to be operated by a user) over a frame image showing content, such as movie and the like, obtained by decoding the encoded video data.

Here, the own device video data producing unit 102 switches the destination to which to output the produced own device video data, depending on the display mode. Specifically, the own device video data producing unit 102 outputs the produced own device video data to a frame buffer in the image processing unit 24 when the display mode is the own device display mode, and to a memory area M1 that is different from the frame buffer in the main memory 20 when the display mode is the other device display mode.

The own device sound data producing unit 103 produces sound data (hereinafter referred to as own device sound data) to be reproduced via the speaker 32 of the entertainment system 10. As a specific example, the own device sound data producing unit 103 decodes the encoded sound data stored in a storage means such as the optical disc 36, hard disk 38, or the like, to thereby produce own device sound data.

Note that, similar to the own device video data producing unit 102, the own device sound data produced by the own device sound data producing unit 103 is not limited to data obtained by decoding the encoded sound data, and may be data produced by executing a program stored in the optical disc 36 or the like. Also, the own device sound data may be one obtained by combining sound data indicating content, such as movie, music, and the like, obtained by decoding the encoded sound data and a sound signal indicating operation sound to be reproduced in response to operation by a user etc. and/or various sound effects.

Here, the own device sound data producing unit 103 switches the destination to which to output the produced own device sound data, depending on the display mode. Specifically, the own device sound data producing unit 103 outputs the produced own device sound data to a sound buffer in the sound processing unit 30 when the display mode is the own device display mode and to a memory area M2 different from the sound buffer in the main memory 20 when the display mode is the other device display mode. The memory area M2 may be either an area different from the above described memory area M1, or an area ensured contiguously in the memory area M1.

The video and sound output unit 104 displays the own device video data produced by the own device video data producing unit 102 and reproduces the own device sound data produced by the own device sound data producing unit 103. Specifically, the video and sound output unit 104 reads the own device video data having been output to the frame buffer, and sequentially displays on the screen of the monitor 26 every predetermined period of time. Also, the own device sound data having been output to the sound buffer is read and reproduced via the speaker 32.

Using the above described respective functions, the entertainment system 10 displays video and reproduces sound by itself, based on the video data and sound data stored in the optical disc 36 and the like when the display mode is the own device display mode. With the above, a user can look at and listen to content, such as, e.g., a movie or the like, and/or play a game.

When the display mode switching unit 101 switches the display mode to the other device display mode, the other device video data producing unit 105 encodes the own device video data produced by the own device video data producing unit 102 into a data format which the portable video display device 50 can handle and process, to thereby produce other device video data.

Specifically, the other device video data producing unit 105 reads a frame image of each of the frames constituting own device video data from the memory area M1 and encodes into a predetermined data format to thereby produce other device video data. For example, the other device video data producing unit 105 produces, through encoding, video data in a data format based on the MPEG-4 (Moving Picture Experts Group phase 4) standard. Note that the other device video data producing unit 105 may select a data format into which data is to be encoded from among a plurality of predetermined data format candidates, based on the information sent from the portable video display device 50.

Here, prior to encoding, the other device video data producing unit 105 may convert the own device video data into a size which the portable video display device 50 can handle and display, and then encode the own device video data subjected to size conversion to thereby produce other device video data. In this case, the size which the portable video display device 50 can handle and display may be determined based on the information stored beforehand in the entertainment system 10, or information sent from the portable video display device 50. With the above, even when the image size which the entertainment system 10 can handle and display on the monitor 26 differs from that which the portable video display device 50 can handle and display on the monitor 50, the entertainment system 10 can produce other device video data which can be displayed on the portable video display device 50, using the own device video data. With the above, it is possible to convert the own device video data originally produced for display on the monitor 26 into data in a format suitable for encoding.

Also, prior to encoding, the other device video data producing unit 105 may carry out color conversion on own device video data. Specifically, e.g., the other device video data producing unit 105 converts colors designated in the RGB color space and contained in the own device video data into color in the YUV color space.

Also, the data format of the other device video data produced by the other device video data producing unit 105 may differ from that of the encoded video data stored in the optical disc 36 or the like and decoded by the own device video data producing unit 102. With the other device video data sent to the portable video display device 50, to be described later, the portable video display device 50 can display video data stored in the optical disc 36 or the like in a data format which the portable video display device 50 originally cannot handle and display.

When the display mode switching unit 101 switches the display mode to the other device display mode, the other device sound data producing unit 106 encodes the own device sound data produced by the own device sound data producing unit 103 into a data format which the portable video display device 50 can handle and display, to thereby produce other device sound data.

Specifically, the other device sound data producing unit 106 reads the own device sound data from the memory area M2 and then encodes into a predetermined data format to thereby produce other device sound data. For example, the other device sound data producing unit 106 produces, through encoding, codec sound data of the MPEG-2 Part7 or MPEG-4 Part3 standard. Alternatively, codec sound data of ATRAC3 (Adaptive Transform Acoustic Coding 3) or the like may be produced. Note that similar to the other device video data producing unit 105, the other device sound data producing unit 106 may select a data format into which data is to be encoded from among a plurality of predetermined data format candidates, based on the information sent from the portable video display device 50.

Here, prior to encoding, the other device sound data producing unit 106 reduces the number of channels of the own device sound data into the number which the portable video display device 50 can handle for reproduction, and encodes the own device sound data that has been to reduction in the number of channels to thereby produce other device sound data. In this case, the number of channels which the portable video display device 50 can handle for reproduction may be determined based on the information stored beforehand in the entertainment system 10 or information sent from the portable video display device 50. With the above, when the number of channels which the entertainment system 10 can handle for reproduction via the speaker 32 differs from that which the portable video display device 50 can handle for reproduction via the speaker 64, the entertainment system 10 can produce other device sound data which the portable video display device 50 can handle for reproduction, using the own device sound data.

Note that in this case, the other device sound data producing unit 106, for example, deletes sound data for one or more channels from the own device sound data having a plurality of channels, to thereby reduce the number of channels. Alternatively, the number of channels can be reduced by mixing sound data for a plurality of channels contained in the own device sound data. For example, the other device sound data producing unit 106 converts own device sound data having a 5.1 or 7.1 channel system into other device sound data having two channels.

Also, similar to the other device video data, the data format of the other device sound data produced by the other device sound data producing unit 106 may differ from that of the encoded sound data stored in the optical disc 36 or the like and decoded by the own device sound data producing unit 103. With the other device sound data sent to the portable video display device 50, to be described later, the portable video display device 50 can reproduce sound data stored in the optical disc 36 or the like in a data format which the portable video display device 50 cannot originally handle for reproduction.

The data sending unit 107 sends the other device video data produced by the other device video data producing unit 105 and the other device sound data produced by the other device sound data producing unit 106 to the portable video display device 50 having sent a connection start request. Note that the data sending unit 107 may encrypt the other device video data and other device sound data before sending. Note that an encryption key used for encryption may be one stored beforehand in the entertainment system 10 or one produced, based on the information sent from the portable video display device 50, according to a predetermined method.

Also, the data sending unit 107 may change the data transfer speed, depending on the amount of the other device video data and other device sound data held in a transmission waiting state in the main memory 20. Also, in addition to, or in the place of, change of the data transfer speed by the data sending unit 107, the other device video data producing unit 105 may change the encoding bit rate for other device video data to produce through encoding. That is, when the amount of the other device video data and other device sound data in a transmission waiting state increases, the encoding bit rate for the other device video data is made lower, and when the amount of the data in the transmission waiting state decreases, the encoding bit rate for the other device video data is made higher. Similarly, the other device sound data producing unit 106 may change the encoding bit rate for other device sound data to be produced, depending on the amount of data in the transmission waiting state. With the above, it is possible to adjust the amount of the video data and sound data in the transmission waiting state, depending on the state of the communication network, and therefore to send the other device video data and other device sound data to the portable video display device 50 without excessively occupying the communication network band.

In the following, respective functions realized by the portable video display device 50 will be described.

In response to an instruction operation issued by a user to the controller 68, the mode switching control unit 108 switches the display mode of the portable video display device 50, and sends a connection start request and a connection end request to the entertainment system 10. Specifically, in response to a connection start instruction by a user, the mode switching control unit 108 switches the display mode to a received data display mode, and sends a connection start request to the entertainment system 10. Also, in response to a connection end instruction by a user, the mode switching control unit 108 switches the display mode to an own device display mode, and sends a connection end request to the entertainment system 10. Note that the received data display mode refers to a mode in which video display and sound reproduction is carried out based on the video data and sound data sent from the entertainment system 10, while the own device display mode refers to a mode in which video display and sound reproduction is carried out based on the video data and sound data produced by its own device, similar to the case with the entertainment system 10.

When the mode switching control unit 108 switches the display mode to the received data display mode, the data receiving unit 109 receives the other device video data and other device sound data sent from the data sending unit 107 of the entertainment system 10 to which a connection start request has been sent. Note that when encrypted data is sent from the data sending unit 107, the data receiving unit 109 decrypts the encrypted data to restore data before encryption. The decryption key used in this case may be one stored beforehand in the portable video display device 50 or one produced based on information held in the portable video display device 50 according to a predetermined method.

It is assumed in this embodiment that the other device video data and other device sound data received by the data receiving unit 109 are stored in a memory area M3 ensured in the main memory 54. Note that the memory area M3 may be divided to separately store the video data and sound data, or may be a single area.

The received video data decoding unit 110 decodes the encoded other device video data received by the data receiving unit 109. Specifically, the received video data decoding unit 110 reads the other device video data stored in the memory area M3, then carries out a decoding process, and outputs the obtained video data to a memory area M4 (an output buffer area) ensured in the main memory 54.

The received sound data decoding unit 111 decodes the encoded other device sound data received by the data receiving unit 109. Specifically, the received sound data decoding unit 111 reads the other device sound data stored in the memory area M3, then carries out a decoding process, and outputs the obtained sound data to a memory area M5 (an output buffer area) ensured in the main memory 54.

The video and sound output unit 112 displays the video data obtained through decoding by the received video data decoding unit 110 and reproduces the sound data obtained through decoding by the received sound data decoding unit 111. Specifically, the video and sound output unit 112 reads the video data from the memory area M4 and outputs the respective frame images constituting the video data to a frame buffer in the image processing unit 56, to sequentially display screen images on the monitor 58. Also, the video and sound output unit 112 reads sound data from the memory area M5 and outputs to a sound buffer in the sound processing unit 62 to reproduce sound via the speaker 64.

Note that it is assumed that the video and sound output unit 112 outputs the video data and sound data obtained through decoding at a predetermined time to the frame buffer and sound buffer. Specifically, it is assumed that the video and sound output unit 112 outputs the video data to the frame buffer and sound data to the sound buffer at a time which enables synchronized video display and sound reproduction.

Note that it is assumed that the received video data decoding unit 110 and received sound data decoding unit 111 decode other device video data and other device sound data, respectively, received every predetermined process unit. Also, note that it is assumed that the memory areas M4 and M5 respectively have sufficient capacity to store video data and sound data for a plurality of process units. With the above, even in a case in which at least one of the received video data decoding unit 110 and received sound data decoding unit 111 does not complete the decoding process within a predetermined period of time (so-called over-run), the video and sound output unit 112 can continue video display and sound reproduction as long as video data and sound data is held in the memory areas M4 and M5, respectively. Further, in this case, the received video data decoding unit 110 and received sound data decoding unit 111 may change the method for decoding, depending on the amount of unprocessed video data and sound data stored in the memory areas M4 and M5. Specifically, in the case when, for example, the decoding process by the received video data decoding unit 110 is delayed and the amount of unprocessed video data having been buffered in the memory area M4 is thus reduced, the received video data decoding unit 110 changes the decoding method to one which accelerates decoding of video data in the following process unit. With the above, the portable video display device 50 can address delay in the decoding process, while continuously carrying out the video display and sound reproduction.

Using the above described respective functions, the portable video display device 50 can attain video display and sound reproduction, based on the video data and sound data read by the entertainment system 10 from the optical disc 36 and the like, and/or data produced by the MPU 11 when the display mode is the received data display mode. With the above, a user can look at and listen to the video and sound on the portable video display device 50, the video and sound being distributed from the entertainment system 10 connected for communication to the portable video display device 50.

Note that when the entertainment system 10 is operating in the other device display mode and a user looks at and listens to video and sound on the portable video display device 50, the entertainment system 10 may display on the monitor 26 information indicating that video and sound is being distributed to the portable video display device 50.

Also, it is assumed that the portable video display device 50 in the own device display mode produces video data which can be displayed on the monitor 58 and sound data which can be reproduced via the speaker 64, based on the data read by the optical disc reading unit 66 from, e.g., an optical disc, and displays video on the monitor 58 and reproduces sound via the speaker 64. With the above, by switching the display mode in response to an instruction from a user, the portable video display device 50 can output both video and sound produced by its own device and video and sound distributed from the entertainment system 10.

In the following, one example of a flow of a process to be carried out by the video display system according to this embodiment will be described based on the flowchart shown in FIG. 5. Note that it is assumed, in the example shown in the diagram, that the entertainment system 10 and portable video display device 50 are both operating in the own device display mode when beginning the process.

Figure 5:
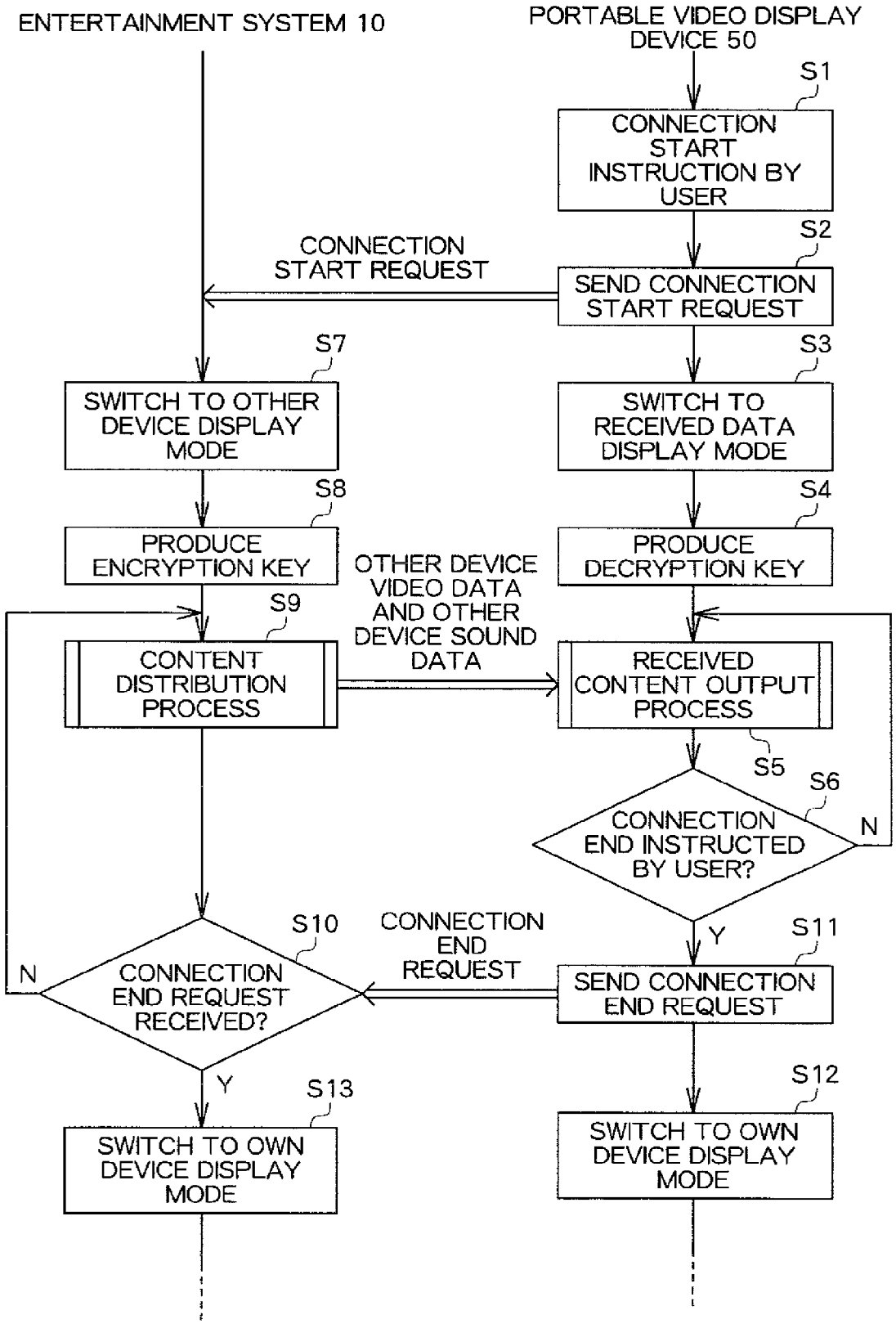
FIG. 5 is a flowchart of an example of a process to be carried out by the video display system according to the embodiment of the present invention.

In the example shown in FIG. 5, initially, the portable video display device 50 receives a connection start instruction issued by a user to the controller 68 (S1). In response to the instruction, the mode switching control unit 108 sends a connection start request to the entertainment system 10 (S2), and switches the display mode of the portable video display device 50 to the received data display mode (S3).

Further, the portable video display device 50 produces a decryption key, based on the predetermined device ID of its own device (S4). Then, based on the other device video data and other device sound data sent from the entertainment system 10, a received content output process for video display and sound reproduction is carried out (S5). Specifically, the data receiving unit 109 receives encrypted data sent from the entertainment system 10 and then restores the other device video data and other device sound data before encryption, using the decryption key produced at S4. Further, the received video data decoding unit 110 and received sound data decoding unit 111 decode the encoded video data and encoded sound data, respectively, obtained by the data receiving unit 109. The video and sound output unit 112 displays the video data on the monitor 58 and reproduces the sound data via the speaker 64. This received content output process is repeated until a user issues a connection end instruction to the controller 68 (S6).

Meanwhile, the entertainment system 10, having received the connection start request sent at S2, carries out the following process. That is, initially, the display mode switching unit 101 switches the display mode to the other device display mode (S7). Further, the entertainment system 10 produces an encryption key for data transmission, based on the device ID of the portable video display device 50 (S8). It is assumed here that the device ID of the portable video display device 50 is sent from the portable video display device 50, together with the connection start request.

Subsequently, in response to a request from the portable video display device 50, the entertainment system 10 carries out a content distribution process to produce other device video data and other device sound data, and send the produced data to the portable video display device 50 (S9). Specifically, the other device video data producing unit 105 encodes the own device video data produced by the on device video data producing unit 102 into other device video data, while the other device sound data producing unit 106 encodes the own device sound data produced by the own device sound data producing unit 103 into other device sound data. Then, the data sending unit 107 encrypts the other device video data and other device sound data, using the encryption key produced at S8, and then sends to the portable video display device 50. This content distribution process is repeated until the portable video display device 50 sends a connection end request (S10).

When a user issues a connection end instruction to the controller 68 of the portable video display device 50, the portable video display device 50 sends a connection end request to the entertainment system 10 (S11), and switches its own display mode to the own device display mode (S12). The entertainment system 10, having received the connection end request, accordingly switches its own display mode to the own device display mode (S13). With the above, the entertainment system 10 and portable video display device 50 thereafter independently display video data and reproduce sound data produced by themselves.

Note that the portable video display device 50 in this embodiment may further have a function for sending, in the received data display mode, information (instruction operation information) describing the content of an instruction operation, carried out by a user with the controller 68, to the entertainment system 10. In this case, according to the instruction operation by the user, described by the instruction operation information received from the portable video display device 50, the entertainment system 10 changes the content of the own device video data and own device sound data. For example, while considering that the instruction operation by the user described by the received instruction operation information is carried out by the controller 42 connected to the entertainment system 10, the entertainment system 10 produces own device video data and own device sound data in response to the instruction operation. With the above, according to the video display system according to this embodiment, a user can operate, for example, a character shown on the screen of the monitor 58 by issuing an instruction operation to the controller 68, and can then look at and listen to the video and sound which resultantly changes. With the above, the user can not only look at and listen to content, such as a movie, outputting the video and sound in a one-sided manner, but also can enjoy content, such as a game and the like, having an interactive nature.

Further, in this case, the size of the memory area M3 where the other device video data and other device sound data received by the above described data receiving unit 109 is stored may be changed according to the type of the content instructed by a user. When content, such as a movie or the like, for which contents do not change in response to an instruction operation by a user, is distributed, even though the video data to be displayed and sound data to be reproduced are held in the memory area M3 for a substantial period of time because of the memory area M3 has a large size, serious inconvenience is not likely to be caused. However, for a game or the like, for which contents will change in response to an instruction operation by a user, a time lag which would be caused due to the large size of the memory area M3 before outputting the video data and sound data received by the portable video display device 50 may deteriorate the real time nature, since the content of the instruction operation by the user is not instantly reflected in the content. Therefore, in distribution of content of a type which will change in response to an instruction operation by a user, the memory area M3 is arranged to have a smaller size so that occurrence of the above described problem can be reduced. Note that the portable video display device 50 may change the size of a memory area, instead of the memory area M3, for storing the video data and sound data restored through decoding by the received video data decoding unit 110 and received sound data decoding unit 111, depending on the type of content.

In the following, an example in which the entertainment system 10 is connected to a plurality of portable video display devices 50 will be described.

In this case, the entertainment system 10 may send common other device video data and other device sound data to the plurality of portable video display devices 50 having sent connection start requests. Alternatively, the entertainment system 10 may send mutually different other device video data and other device sound data.

In the case where mutually different other device video data and other device sound data are sent, the entertainment system 10 receives, for example, device identification information (device ID and the like) identifying a respective portable video display device 50, sent from the portable video display device 50 together with the connection start request. Then, the other device video data and other device sound data are sent to the transmission destination identified by the received device identification information. With the above, mutually different other device video data and other device sound data can be sent to the respective portable video display devices 50 having sent the connection start requests.

Also, it is assumed that the entertainment system 10 may hold information correlating each of the plurality of portable video display devices 50 to any of a plurality of groups, and may send mutually different or the same other device video data and other device sound data produced for the respective groups to the respective portable video display devices 50 correlated to the respective groups.

In this case, the portable video display device 50 having sent a connection start request to the entertainment system 10 sends information identifying the group to which its own device belongs, to the entertainment system 10, based on an instruction operation by a user or the like. In response to the information, the entertainment system 10 produces information correlating the portable video display device 50 to such a group.

Figures 6, 7:
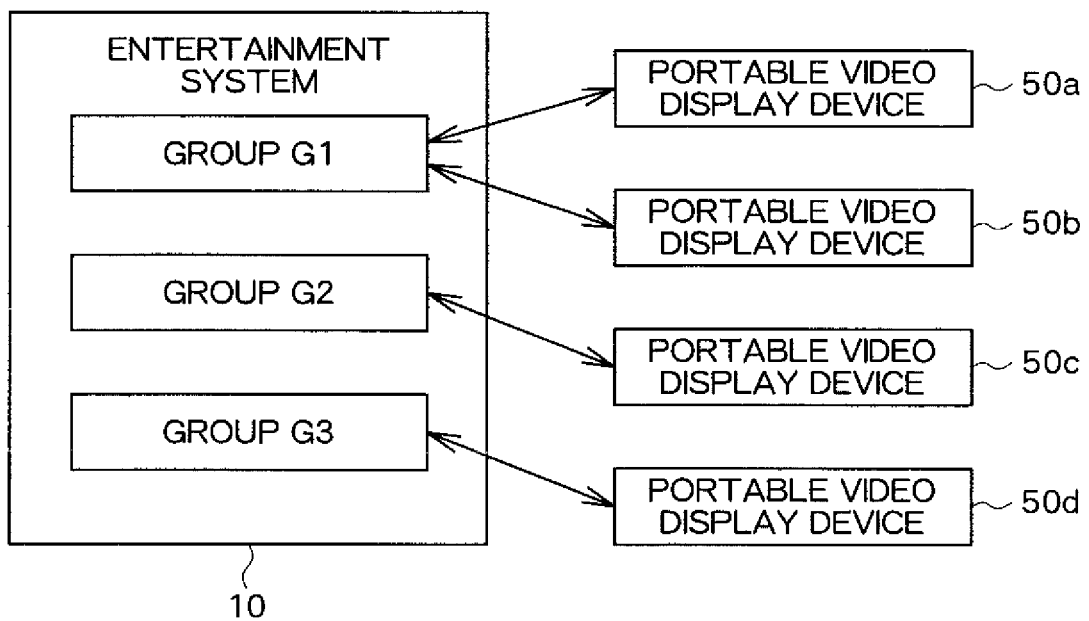
FIG. 6 is a diagram for conceptually explaining an example of connection between an entertainment system and a plurality of portable video display devices.
FIG. 7 is a diagram for explaining an example of a table held by the entertainment system according to the embodiment of the present invention.

FIG. 6 is a diagram conceptually explaining one example of connection between the entertainment system 10 and a plurality of portable video display devices 50 in this case. In the example shown in the diagram, the entertainment system 10 manages three groups, namely, groups G1, G2, and G3, and holds information correlating the portable video display devices 50a and 50b to the group G1, the portable video display device 50c to the group G2, and the portable video display device 50d to the group G3. FIG. 7 is a diagram showing one example of a table showing information correlating a portable video display device 50 to such a group.

In the example shown in FIG. 6, the entertainment system 10 produces mutually different own device video data and own device sound data for respective groups, and then encodes the data to thereby produce mutually different other device video data and other device sound data. Then, the other device video data and other device sound data produced for the respective groups are sent to the respective portable video display devices 50 correlated to the respective groups. With the above, the portable video display devices 50a and 50b display the same video and reproduce the same sound. Meanwhile, the portable video display devices 50c and 50d display video and reproduce sound different from those for the other portable video display devices 50. Note that the entertainment system 10 may produce and send the same other device video data and other device sound data with respect to different groups according to a predetermined condition.

Further, in response to an instruction operation by a user or the like, the portable video display device 50 may send to the entertainment system 10 information for changing the group to which its own device belongs, while receiving video and sound. According to the information, the entertainment system 10 updates the information, as shown as an example in FIG. 7, correlating the portable video display device 50 to a group. With the above, the portable video display device 50, while receiving content from the entertainment system 10, can change the content to be received to one being distributed to another portable video display device 50.

Also, irrespective of the information sent from the portable video display device 50, the entertainment system 10 may change the group to which a respective portable video display device 50 is correlated, based on another condition. For example, the entertainment system 10 changes the group to which a respective portable video display device 50 is correlated, according to change in the situation of the communication network among the respective portable video display devices 50 and/or the state of content being produced.

According to the above described example, the user can select content which they wish to look at and listen to from among a plurality of content items distributed from the entertainment system 10, and change the content to receive while receiving content. Also, when a plurality of groups correspond to, e.g., a plurality of scenes in one game, a plurality of users can simultaneously participate in one game on a plurality of portable video display devices 50, and moreover, by switching the scenes, the respective users can enjoy the same video and sound with other users at one time, and video and sound for a scene dedicated to themselves, different from those for another user, at another time.

It should be noted that the embodiment of the present invention is not limited to the above described embodiment. For example, the entertainment system 10 and portable video display device 50 may be connected via various communication networks, such as the Internet and the like, in addition to a radio communication network. Also, although the video and sound output unit 104 of the entertainment system 10 reproduces sound via the speaker 32 and the video and sound output unit 112 of the portable video display device 50 reproduces sound via the speaker 64 in the above description, sound may be reproduced via an ear-phone or the like connected to the respective devices instead.

Also, although the own device video data producing unit 102 outputs the produced own device video data to either the frame buffer or memory area M1, depending on the display mode in the above described embodiment, the own device video data may be output to the frame buffer in either display mode. In this case, in the other device display mode, the other device video data producing unit 105 sequentially reads frame images forming own device video data once output to the frame buffer, and then carries out an encoding process to produce other device video data. Note that the other device video data producing unit 105 may convert the image data read from the frame buffer into a size which the portable video display device 50 can handle and display before outputting to another memory area ensured in the main memory 20, and then carries out an encode process, based on the image data output to the memory area, to produce other device video data.

Also, similar to the case with the video data, the own device sound data producing unit 103 may always output the own device sound data to the sound buffer irrespective of the display mode. In this case, the other device sound data producing unit 106 carries out an encoding process, based on the own device sound data read from the sound buffer, to produce other device sound data.

Also, although the entertainment system 10 carries out a process in the above described embodiment, while selectively switching between the own device display mode, in which video is displayed on the monitor 26 and sound is reproduced via the speaker 32, and the other device display mode, in which video and sound are distributed to the portable video device 50, the entertainment system 10 may operate in a different display mode. For example, the entertainment system 10 may operate in a display mode in which common video and sound are displayed and reproduced simultaneously on its own device and the portable video display device 50. Alternatively, the entertainment system 10 may operate in a display mode in which mutually different video and sound are displayed and reproduced simultaneously on its own device and the portable video display device 50. Further, in this case, the other device video data and other device sound data to be sent to the portable video display device 50 is not limited to those produced by encoding the own device video data and own device sound data, and may be those produced through the process same as that which is carried out by the on device video data producing unit 102 and/or own device sound data producing unit 103.

The invention claimed is:

1. A video display system having a first video display device and a second video display device, connected to each other for communication,
   wherein the first video display device comprises:
      a first video and sound output unit configured to display first video data and reproduce first sound data;
      an operation input unit configured to receive an operation input of a user; and
      a data sending unit configured to send second video data in accordance with the first video data and second sound data in accordance with the first sound data to the second video display device;
      an encoding unit configured to encode the first video data and the first sound data into a data format, which the second video display device is able to handle, to produce second video data and second sound data;
      a first receiving unit configured to receive group identification information from each of a plurality of second video display devices, the identification information identifying, among a plurality of groups, a group to which each of the plurality of second video display devices belongs, wherein the plurality of second video display devices are connected to the first video display device for communication; and
      a related information generation unit configured to generate related information for relating each of the plurality of second video display devices to any of the plurality of groups, in response to the received group identification information,
      wherein the encoding unit produces the plurality of pieces of the second video data and the plurality of pieces of the second sound data, which are mutually different, in response to the plurality of groups, and
      wherein the data sending unit sends the plurality of pieces of the second video data and the plurality of pieces of the second sound data, which are produced for the plurality of groups respectively, to the second video display device that is related to the group in the related information,
   wherein the second video display device comprises:
      a data receiving unit configured to receive the second video data and the second sound data;
      a second video and sound output unit configured to display the second video data and reproduce the second sound data; and
      an operation information sending unit configured to receive the operation input of the user and send operation information indicating content of the operation input to the first video display device,
   wherein the first video display device operates in accordance with the operation input received by the operation input unit in a first operation mode in which the first video and sound output unit displays the first video data and reproduces the first sound data,
   wherein the first video display device operates in accordance with the operation information sent by the operation information sending unit of the second video display device as the operation input received by the operation input unit in a second operation mode in which the data sending unit sends the second video data and the second sound data to the second video display device, and
   wherein the first video and sound output unit changes the first video data and the first sound data using the operation information sent by the operation information sending unit of the second video display device in a received display mode and the content of the first video data and the first sound data has interactive nature.

2. A first video display device connected for communication to a second video display device, comprising:
a first video and sound output unit configured to display first video data and reproduce first sound data;
an operation input unit configured to receive an operation input of a user;
a data sending unit configured to send second video data in accordance with the first video data and second sound data in accordance with the first sound data to the second video display device;
an operation information receiving unit configured to receive operation information that is sent by the second video display device upon receiving the operation input of the user, the operation information indicating content of the operation input;
an encoding unit configured to encode the first video data and the first sound data into a data format, which the second video display device is able to handle, to produce the second video data and the second sound data;
a first receiving unit configured to receive group identification information from each of a plurality of second video display devices, the identification information identifying, among a plurality of groups, a group to which each of the plurality of second video display devices belongs, wherein the plurality of second video display devices are connected to the first video display device for communication; and
a related information generation unit configured to generate related information for relating each of the plurality of second video display devices to any of the plurality of groups, in response to the received group identification information,
wherein the first video display device operates in accordance with the operation input received by the operation input unit in a first operation mode in which the video and sound output unit displays the first video data and reproduces the first sound data,
wherein the first video display device operates in accordance with the operation information sent by the second video display device as the operation input received by the operation input unit in a second operation mode in which the data sending unit sends the second video data and the second sound data to the second video display device,
wherein the first video and sound output unit changes the first video data and the first sound data using the operation information sent by the operation information sending unit of the second video display device in a received display mode and the content of the first video data and the first sound data has interactive nature,
wherein the encoding unit produces the plurality of pieces of the second video data and the plurality of pieces of the second sound data, which are mutually different, in response to the plurality of groups, and
wherein the data sending unit sends the plurality of pieces of the second video data and the plurality of pieces of the second sound data, which are produced for the plurality of groups respectively, to the second video display device that is related to the group in the related information.

3. The first video display device according to claim 2, further comprising a unit configured to respectively receive identification information from a plurality of second video display devices, which are connected to the first video display device for communication,
wherein the encoding unit produces a plurality of portions of the second video data and a plurality of portions of the second sound data, which are mutually different, and
wherein data sending unit sends the plurality of portions of the second video data and the plurality of portions of the second sound data, which are mutually different, to each of the plurality of second video display devices that are specified by the identification information.

4. The first video display device according to claim 2, further comprising:
a second receiving unit configured to receive, from the plurality of second video display devices, change information for instructing a change of the groups to which the second video display devices belongs respectively; and
an updating unit configured to update the related information generated by the related information generation unit, based on the received change information,
wherein the data sending unit changes, in response to the updated related information, the second video data and the second sound data to be sent to the second video display device that has sent the change information.

5. The video display system according to claim 1, wherein the data format of the second video data is different from the data format of the first video data.

6. The video display system according to claim 1, wherein the data format of the second sound data is different from the data format of the first sound data.

7. The first video display device according to claim 2, wherein the data format of the second video data is different from the data format of the first video data.

8. The first video display device according to claim 2, wherein the data format of the second sound data is different from the data format of the first sound data.

9. The video display system according to claim 1, wherein the first video and sound output unit changes, in response to the operation information sent by the operation information sending unit of the second video display device, content of the first video data and the first sound data in the second operation mode in which the data sending unit sends the second video data to the second video display device.

10. The first video display device according to claim 2, wherein the first video and sound output unit changes, in response to the operation information sent by the operation information sending unit of the second video display device, content of the first video data and the first sound data in the second operation mode in which the data sending unit sends the second video data to the second video display device.

11. A video display method for a video display system having a first video display device and a second video display device, connected to each other for communication, comprising:
displaying first video data and reproducing first sound data by a first video and sound output unit;
receiving an operation input of a user by an operation input unit;
sending second video data in accordance with the first video data and second sound data in accordance with the first sound data to the second video display device by a data sending unit;
receiving the second video data and the second sound data by a data receiving unit;
displaying the second video data and reproducing the second sound data by a second video and sound output unit; and receiving the operation input of the user and sending operation information indicating content of the operation input to the first video display device by an operation information sending unit;

encoding the first video data and the first sound data into a data format, which the second video display device is able to handle, to produce the second video data and the second sound data;

receiving group identification information from each of a plurality of second video display devices, the identification information identifying, among a plurality of groups, a group to which each of the plurality of second video display devices belongs, wherein the plurality of second video display devices are connected to the first video display device for communication; and generating related information for relating each of the plurality of second video display devices to any of the plurality of groups, in response to the received group identification information, wherein the first video display device includes the first video and sound output unit, the operation input unit, and the data sending unit, wherein the second video display device includes the data the receiving unit, the second video and sound output unit, and the operation information sending unit, wherein the first video display device operates in accordance with the operation input received by the operation input unit in a first operation mode in which the first video and sound output unit displays the first video data and reproduces the first sound data, wherein the first video display device operates in accordance with the operation information sent by the operation information sending unit of the second video display device as the operation input received by the operation input unit in a second operation mode in which the data sending unit sends the second video data and the second sound data to the second video display device, wherein the first video and sound output unit changes the first video data and the first sound data using the operation information sent by the operation information sending unit of the second video display device in a received display mode and the content of the first video data and the first sound data has interactive nature, wherein the encoding step produces the plurality of pieces of the second video data and the plurality of pieces of the second sound data, which are mutually different, in response to the plurality of groups, and wherein sending second video data step includes sending the plurality of pieces of the second video data and the plurality of pieces of the second sound data, which are produced for the plurality of groups respectively, to the second video display device that is related to the group in the related information.

12. A video display method for a first video display device connected for communication to a second video display device, comprising:

displaying first video data and reproduce first sound data by a first video and sound output unit;

receiving an operation input of a user by an operation input unit;

sending second video data in accordance with the first video data and second sound data in accordance with the first sound data to the second video display device by a data sending unit; and receiving operation information that is sent by the second video display device upon receiving the operation input of the user and indicates content of the operation input by an operation information receiving unit, encoding the first video data and the first sound data into a data format, which the second video display device is able to handle, to produce the second video data and the second sound data;

receiving group identification information from each of a plurality of second video display devices, the identification information identifying, among a plurality of groups, a group to which each of the plurality of second video display devices belongs, wherein the plurality of second video display devices are connected to the first video display device for communication; and generating related information for relating each of the plurality of second video display devices to any of the plurality of groups, in response to the received group identification information, wherein the first video display device operates in accordance with the operation input received by the operation input unit in a first operation mode in which the first video and sound output unit displays the first video data and reproduces the first sound data, wherein the first video display device operates in accordance with the operation information sent by the operation information sending unit of the second video display device as the operation input received by the operation input unit in a second operation mode in which the data sending unit sends the second video data and the second sound data to the second video display device, wherein the first video and sound output unit changes the first video data and the first sound data using the operation information sent by the operation information sending unit of the second video display device in a received display mode and the content of the first video data and the first sound data has interactive nature, wherein the encoding step produces the plurality of pieces of the second video data and the plurality of pieces of the second sound data, which are mutually different, in response to the plurality of groups, and wherein sending second video data step includes sending the plurality of pieces of the second video data and the plurality of pieces of the second sound data, which are produced for the plurality of groups respectively, to the second video display device that is related to the group in the related information.

13. A non-transitory computer readable medium storing a program for a first video display device connected for communication to a second video display device, the program for causing a computer to function as:

a first video and sound output unit configured to display first video data and reproduce first sound data;

an operation input unit configured to receive an operation input of a user;

a data sending unit configured to send second video data in accordance with the first video data and second sound data in accordance with the first sound data to the second video display device;

an operation information receiving unit configured to receive operation information that is sent by the second video display device upon receiving the operation input of the user and indicates content of the operation input, an encoding unit configured to encode the first video data and the first sound data into a data format, which the second video display device is able to handle, to produce the second video data and the second sound data;

a first receiving unit configured to receive group identification information from each of a plurality of second video display devices the identification information identifying, among a plurality of groups, a group to which each of the plurality of second video display devices belongs, wherein the plurality of second video display devices are connected to the first video display device for communication; and a related information generation unit configured to generate related information for relating each of the plurality of second video display devices to any of the plurality of groups, in response to the received group identification information, wherein the first video display device operates in accordance with the operation input received by the operation input unit in a first operation mode in which the first video and sound output unit displays the first video data and reproduces the first sound data, wherein the first video display device operates in accordance with the operation information sent by the operation information sending unit of the second video display device as the operation input received by the operation input unit in a second operation mode in which the data sending unit sends the second video data and the second sound data to the second video display device, wherein the first video and sound output unit changes the first video data and the first sound data using the operation information sent by the operation information sending unit of the second video display device in a received display mode and the content of the first video data and the first sound data has interactive nature, wherein the encoding unit produces the plurality of pieces of the second video data and the plurality of pieces of the second sound data, which are mutually different, in response to the plurality of groups, and wherein the data sending unit sends the plurality of pieces of the second video data and the plurality of pieces of the second sound data, which are produced for the plurality of groups respectively, to the second video display device that is related to the group in the related information.

* * * * *